United States Patent [19]

Jones

[11] Patent Number: 5,006,237
[45] Date of Patent: Apr. 9, 1991

[54] SPIN-ON OIL FILTER ADAPTOR FOR FOUR CYLINDER CONTINENTAL AIRCRAFT ENGINES

[76] Inventor: Floyd B. Jones, P.O. Box 3052, Borger, Tex. 79008

[21] Appl. No.: 344,357

[22] Filed: Aug. 14, 1989

[51] Int. Cl.$^5$ .............................................. F01M 11/03
[52] U.S. Cl. ........................... 210/168; 210/DIG. 17; 184/6.24; 123/196 A
[58] Field of Search ................ 210/DIG. 17, 168, 186; 184/6.24, 6.22; 123/196 AB

[56] References Cited

U.S. PATENT DOCUMENTS 1,854,971  4/1932  Allen .................................... 184/6.24
3,066,803  12/1962  Seils, Jr. .............................. 210/168

OTHER PUBLICATIONS

Aircraft Spruce and Specialty Company, 1989 Catalog, p. 168, Advertisement for Spin-On Oil Filter Adaptors.
Trade-A-Plane, Third Jan. Issue 1990, p. 11, El Reno Aviation, Inc., Advertisement for Spin-On Oil Filter Adaptors for Continental Engines.

Primary Examiner—Robert A. Dawson
Assistant Examiner—Matthew O. Savage
Attorney, Agent, or Firm—Dunlap, Codding, Peterson & Lee

[57] ABSTRACT

An adaptor for mounting a conventional spin-on oil filter to Continental four cylinder aircraft engines is disclosed herein. The adapter includes a base which is connected to an offset flange via a post. The base of the adapter is mounted to the oil cooler pad of the engine crankcase. Inlet and outlet passages in the base are aligned with oil inlet and outlet openings in the oil cooler pad and extend through the base and post to the offset flange. The filter is mounted to the offset flange and placed in flow communication with the oil passages via an annular groove and a hollow stud.

1 Claim, 2 Drawing Sheets

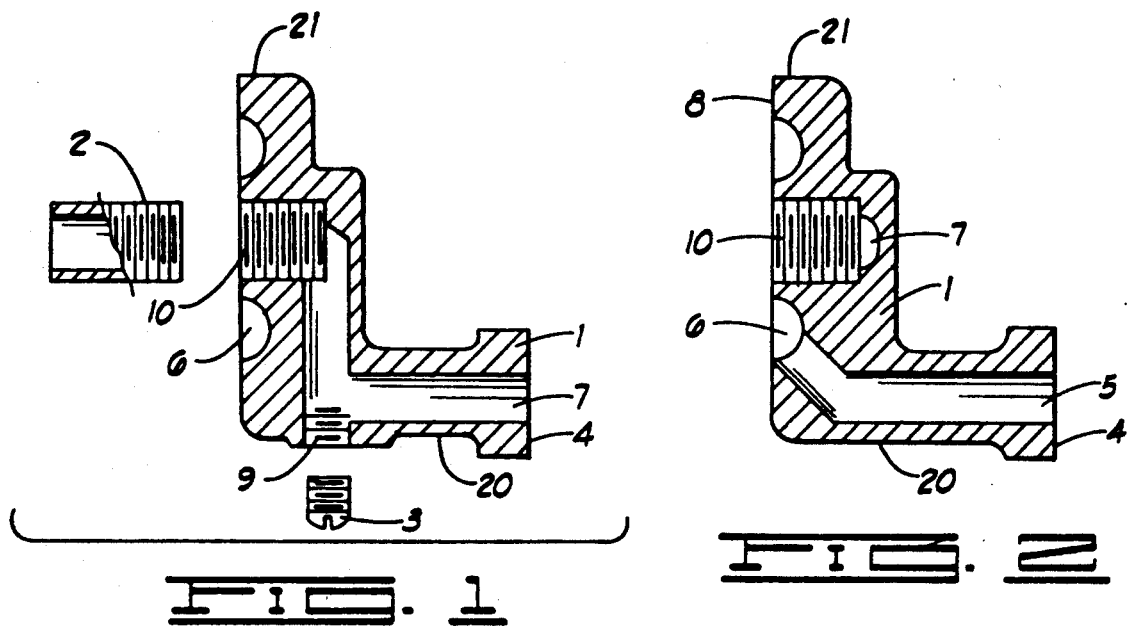
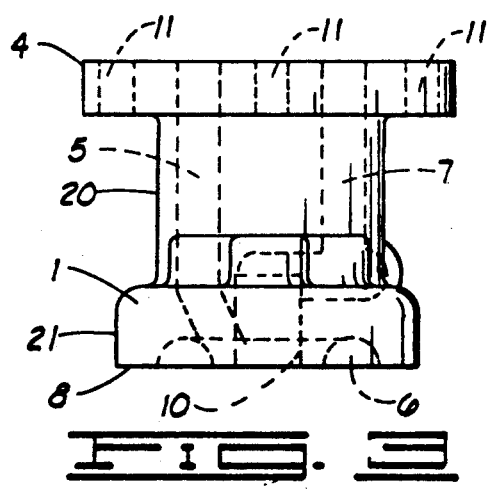
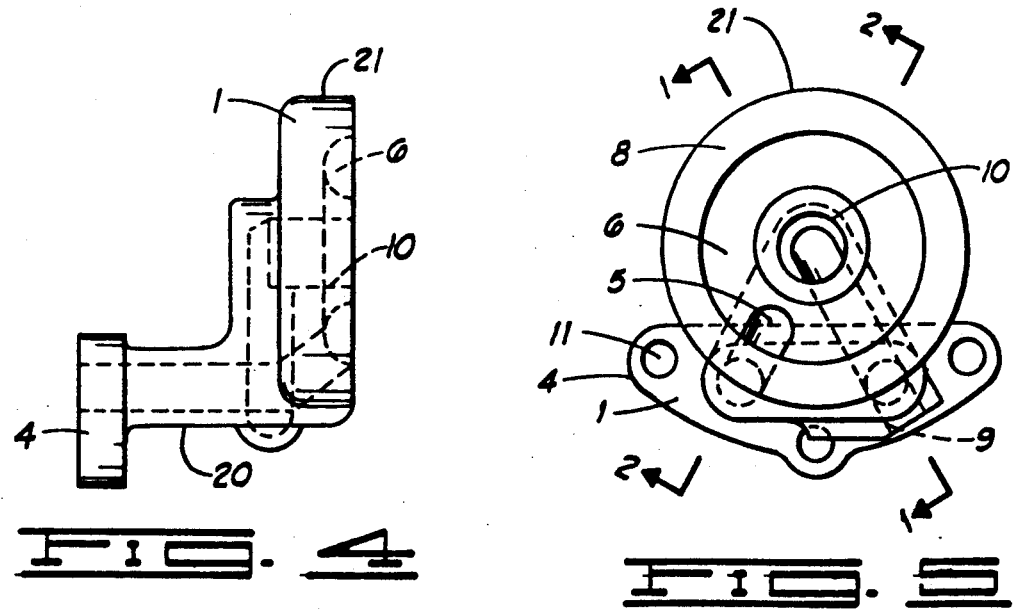

SPIN-ON OIL FILTER ADAPTOR FOR FOUR CYLINDER CONTINENTAL AIRCRAFT ENGINES

BACKGROUND OF THE INVENTION

1. Field of the Invention

The invention relates to a device that permits the installation of a spin-on oil filter on the four cylinder aircraft engines, manufactured by Teledyne Continental Motors Corp., to provide clean filtered oil to the engine.

2. Description of the Prior Art

The engine, as manufactured, is provided only with a brass screen to reduce particle contamination of the oil. The only filter systems available are the obsolete cartridge type that must be remotely mounted and connected to the engine with flexible oil lines. These oil lines can leak creating a serious fire hazard or worse might rupture causing a loss of oil to the engine. In either case an emergency landing is eminent.

SUMMARY OF THE INVENTION

The invention relates to a device that permits the installation of a spin-on oil filter on the four cylinder aircraft engines, manufactured by Teledyne Continental Motors Corp., that have no provision for filtering the oil. The device mounts on the engine crank-case, without modification of the engine, and requires no external lines to carry the oil from the engine to the filter and back to the engine thereby eliminating the possibility of hazardous leaks or complete loss of engine oil.

It is the object of this invention to provide a simple, safe, clean, and reliable filtering system for the engine oil that will add life to the engine.

BRIEF DESCRIPTION OF THE DRAWINGS

FIG. 1 is a sectional view, along Section B—B of FIG. 5, showing the outlet oil passage 7, the hollow stud 2 that retains the filter to the Adaptor body 1, and the pipe plug 3 that closes the side opening of the outlet oil passage.

FIG. 2 is a sectional view, along Section A—A of FIG. 5, showing the inlet oil passage 5 of the Adaptor.

FIG. 3 is an aft view of the Adaptor.

FIG. 4 is a view of the Adaptor from above.

FIG. 5 is a view of the Adaptor, from the left side, showing the annular oil groove 6 and the filter seal face 8.

DESCRIPTION

Figure 6:
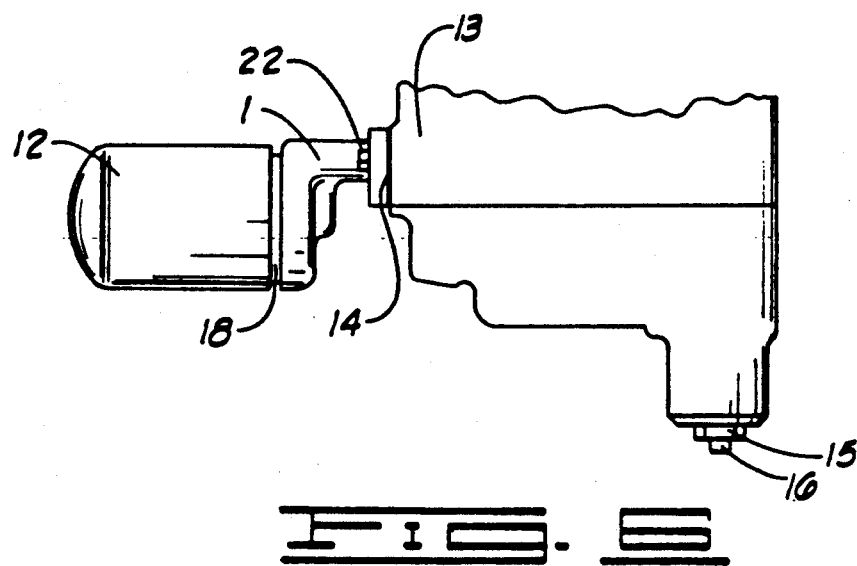
FIG. 6 is a view, from above, showing the Adaptor 1 with filter 12 installed on the oil cooler pad 14 of the engine crank-case 13.
Figure 7:
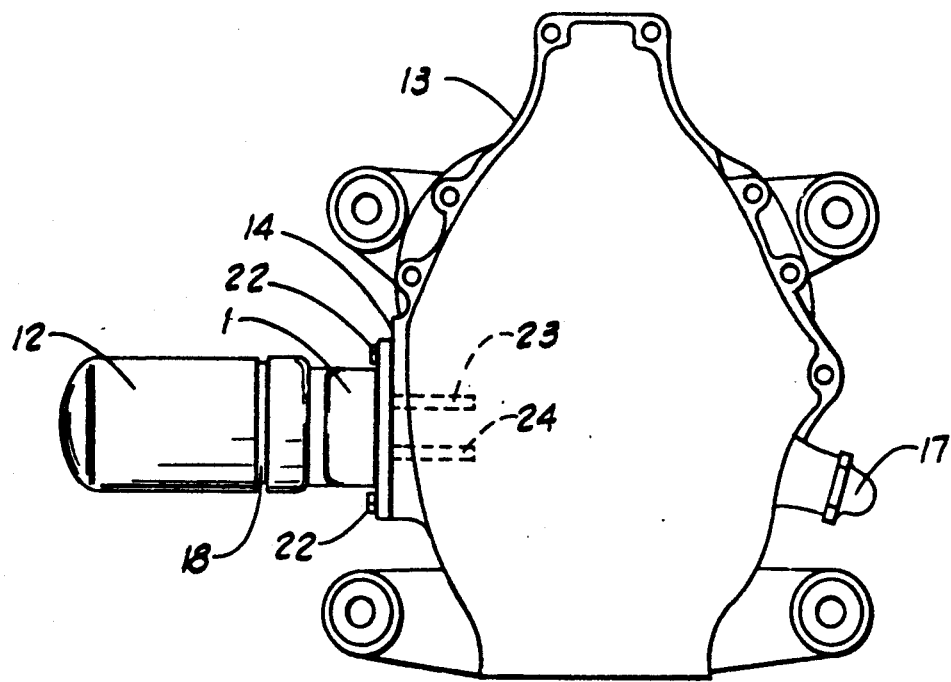
FIG. 7 is a view, from the back of the engine, showing the Adaptor 1 with filter 12 installed on the oil cooler pad 14 of the engine crank-case 13.

The filter adaptor is fabricated from an aluminum casting 1. The casting is fashioned with a base 4 from which extends a post 20 upon which is mounted an offset flange 21. The face of the base is machined to match the existing oil cooler pad 14 on the left side of the crankcase 13 behind the #2 cylinder. The face of the offset flange is machined with an annular oil groove 6 for the passage of oil to the inlet side of the filter 12, an annular flat 8 to match the seal face 18 of the filter, and a hole 10 in the center which is threaded to accept a hollow stud 2 for the attachment of the filter and to permit the oil to return from the filter to the engine. The casting is then drilled from the base for the inlet and outlet oil passages 5, 7 to match the holes 23, 24 in the oil cooler pad on the engine, from the flange face groove to intersect with the inlet passage from the base, and through the side of the post to connect the flange center hole with the outlet hole in the base. Three additional holes 11 are drilled in the base to match the mounting studs 22 around the oil cooler pad of the engine.

What is claimed is:

1. An apparatus, comprising:
    a four cylinder Continental Aircraft engine with an oil cooler pad having two openings for oil passage on a crank case of the engine;
    a filter adaptor body connected to said oil cooler pan and having an oil inlet passage and an oil outlet passage with the oil inlet passage in the filter adaptor body being aligned with one of the openings in the oil cooler pad and the oil outlet passage in the filter adaptor body being aligned with the other opening in the oil cooler pad; and
    a spin on filter connected to the filter adaptor body with the oil inlet passage and the oil outlet passage being in flow communication with the spin on filter whereby oil is circulated from the oil inlet passage through the spin on filter from one of said holes and discharged back into said other hole through the oil outlet passage.

* * * * *